(No Model.)

J. J. SEIFERT.
BAKING PAN.

No. 410,936. Patented Sept. 10, 1889.

Witnesses
Wm. S. Hodges
Charles F. Roberts

Inventor
John J. Seifert,
By Patrick O'Farrell
Attorney.

UNITED STATES PATENT OFFICE.

JOHN J. SEIFERT, OF GILMORE CITY, IOWA.

BAKING-PAN.

SPECIFICATION forming part of Letters Patent No. 410,936, dated September 10, 1889.

Application filed March 30, 1889. Serial No. 305,422. (No model.)

*To all whom it may concern:*

Be it known that I, JOHN, J. SEIFERT, a citizen of the United States of America, residing at Gilmore City, in the county of Pocahontas and State of Iowa, have invented certain new and useful Improvements in Baking-Pans, of which the following is a specification, reference being had therein to the accompanying drawings.

This invention pertains to certain new and useful improvements in heat-protectors for bread-baking pans, having for its object the provision of simple and highly-efficient means whereby the dough in a pan is permitted to rise without falling over to one side, and by which the said dough can be thoroughly cooked and browned.

To this end the invention consists in providing a bread-baking pan with a rigid heat-protector, whereby said pan and protector can be inverted during the baking operation, substantially as hereinafter fully set forth.

Figure 1:
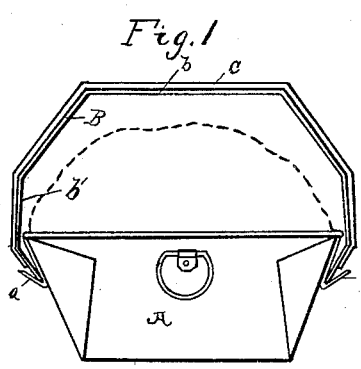
Figure 2:
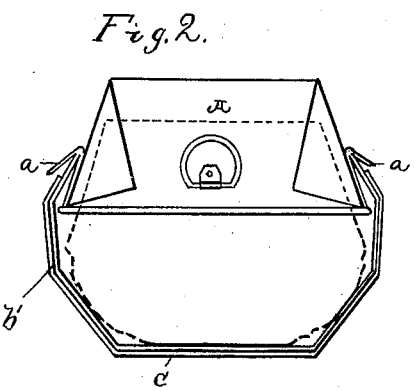
Figure 3:
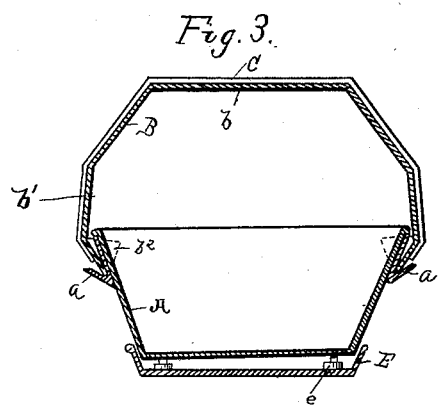
Figure 4:
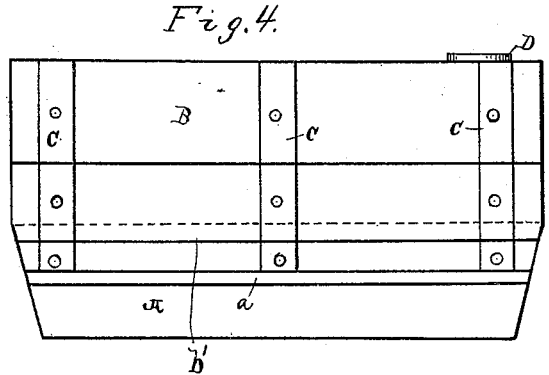

In the accompanying drawings, Figure 1 is an end view of my improved baking-pan, showing a loaf of bread therein in dotted lines. Fig. 2 is a similar view showing the parts inverted. Fig. 3 is a central cross-sectional view. Fig. 4 is a side elevation.

Referring to the drawings, A designates the bread-baking pan, to the inclined longitudinal sides of which are secured approximately-V-shaped plates or gutters $a\ a$, as shown.

B is the shield or protector, constituting an upper supplementary section. The same is composed, preferably, of one piece of sheet metal having an upper flat surface $b$ and lower inwardly-extending longitudinal sides $b'\ b'$, the forward ends of which are inwardly bent or provided with flanges $b^2$. To the outer surface of the shield B is secured a series of strengthening-strips C, which add additional strength thereto and serve to hold the same in proper shape. A ring-handle D is secured to the upper forward end of the shield.

To use my improved pan, the lower inclined sides $b'$ of the shield B are inserted into the forward ends of the gutter $a$, and the slide is then forced over the pan to its full extent, its inward movement being limited by the flanges $b^2$.

In practice the dough is first placed in the pan and the shield is then inserted in position, after which the pan is placed in the oven. The bread in rising will be prevented from falling over to one side by the shield. After the lower part of the dough is sufficiently cooked the pan and its contents are entirely inverted and the upper portion of the loaf rests upon the shield B, and thus the same is still further baked, while the now upper portion is thoroughly browned.

By means of my invention the thorough baking and browning of a loaf of bread is insured and without the necessity of removing the pan from the oven.

It is obvious that if desired the shield may be constructed in extensible sections, as described and claimed in Letters Patent No. 398,192, granted to me on the 19th day of February, 1889.

In connection with my invention as above described I generally employ a supplementary pan E, slightly larger than the lower end of pan A, which is intended to fit therein. In each corner of this pan is a short stud, projection, or rivet $e$, upon which pan A is designed to rest. The object of this lower supplementary pan is to prevent the bottom of the bread from burning and to permit a free circulation of hot air beneath pan A.

I claim as my invention—

1. A baking-pan having plates or gutters secured to its sides and the shield or section having lower inclined sides entering said gutters and inclosing the upper portions of said sides, substantially as set forth.

2. The baking-pan having V-shaped plates or gutters secured to its sides, the shield or section having an upper flat portion and lower inclined sides and forward flanged portions, and a ring-handle, substantially as set forth.

In testimony whereof I affix my signature in presence of two witnesses.

JOHN J. SEIFERT.

Witnesses:
P. L. CHIPMAN,
F. A. FREEMAN.